(12) United States Patent
Lin et al.

(10) Patent No.: US 11,081,106 B2
(45) Date of Patent: Aug. 3, 2021

(54) CONTEXTUAL SPOKEN LANGUAGE UNDERSTANDING IN A SPOKEN DIALOGUE SYSTEM

(71) Applicant: Microsoft Technology Licensing, LLC, Redmond, WA (US)

(72) Inventors: Xihui Lin, Montreal (CA); Andrew James McNamara, Cambridge (CA); Jing He, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 15/687,202

(22) Filed: Aug. 25, 2017

(65) Prior Publication Data
US 2019/0066668 A1    Feb. 28, 2019

(51) Int. Cl.
*G10L 15/14* (2006.01)
*G10L 15/16* (2006.01)
(Continued)

(52) U.S. Cl.
CPC .......... *G10L 15/22* (2013.01); *G06F 16/3329* (2019.01); *G06F 16/3344* (2019.01); *G06F 40/295* (2020.01); *G06N 5/027* (2013.01); *G10L 15/063* (2013.01); *G10L 15/14* (2013.01); *G10L 15/16* (2013.01); *G10L 15/1815* (2013.01); *G06F 40/30* (2020.01); *G06N 3/0445* (2013.01); *G06N 7/005* (2013.01); *G10L 15/1822* (2013.01); *G10L 2015/223* (2013.01)

(58) Field of Classification Search
CPC .......... G06F 16/36; G06F 17/27; G06F 17/30; G10L 15/14

USPC .............................................. 704/9, 706, 231
See application file for complete search history.

(56) References Cited

U.S. PATENT DOCUMENTS 5,621,857 A * 4/1997 Cole ........................ G10L 15/16
704/231
7,725,321 B2    5/2010 Bennett
(Continued)

FOREIGN PATENT DOCUMENTS

WO    2016209924 A1    12/2016
WO    2017007740 A1    1/2017

OTHER PUBLICATIONS

Hakkani-Tur, et al., "Multi-Domain Joint Semantic Frame Parsing Using Bi-Directional RNN-LSTM", In Journal Interspeech, Jun. 24, 2016, pp. 715-719.

(Continued)

*Primary Examiner* — Akwasi M Sarpong

(57) ABSTRACT

A spoken dialogue system includes a spoken language understanding apparatus. The spoken language understanding apparatus can include an intent apparatus and a selection apparatus. The intent apparatus is configured to determine if a query comprises a global command, to determine if an intent associated with a query is or is not included in a domain that is supported by the spoken dialogue system, to determine if a query comprises a confirmation type, to tag one or more entities in a query, and to determine an intent probability distribution and a domain probability distribution that is associated with a query. When the query includes an entity that is included in two or more possible entities, the selection apparatus is configured to provide a score for each of the two or more possible entities.

20 Claims, 12 Drawing Sheets

(51) Int. Cl.

| | |
|---|---|
| *G10L 15/06* | (2013.01) |
| *G06N 5/02* | (2006.01) |
| *G06F 16/332* | (2019.01) |
| *G06F 16/33* | (2019.01) |
| *G10L 15/22* | (2006.01) |
| *G10L 15/18* | (2013.01) |
| *G06F 40/295* | (2020.01) |
| *G06N 3/04* | (2006.01) |
| *G06N 7/00* | (2006.01) |
| *G06F 40/30* | (2020.01) |

(56) References Cited

U.S. PATENT DOCUMENTS

| | | | |
|---|---|---|---|
| 9,477,654 B2 | 10/2016 | He et al. | |
| 2006/0184370 A1* | 8/2006 | Kwak | G10L 15/1822 704/275 |
| 2008/0162138 A1* | 7/2008 | Gurram | G06F 3/167 704/257 |
| 2008/0201135 A1* | 8/2008 | Yano | G10L 15/1822 704/201 |
| 2009/0018680 A1* | 1/2009 | Matsuoka | G10L 19/018 700/94 |
| 2010/0299136 A1* | 11/2010 | Tong | G06F 17/279 704/9 |
| 2012/0016678 A1* | 1/2012 | Gruber | G10L 15/22 704/275 |
| 2012/0053945 A1* | 3/2012 | Gupta | G10L 15/22 704/256 |
| 2013/0227419 A1* | 8/2013 | Lee | G06F 3/04883 715/728 |
| 2014/0019873 A1* | 1/2014 | Gupta | G06F 9/451 715/744 |
| 2014/0172899 A1* | 6/2014 | Hakkani-Tur | G06Q 10/02 707/759 |
| 2014/0222433 A1* | 8/2014 | Govrin | G06Q 40/02 704/260 |
| 2015/0228275 A1* | 8/2015 | Watanabe | G10L 15/22 704/275 |
| 2016/0055240 A1* | 2/2016 | Tur | G10L 15/22 707/706 |
| 2016/0154792 A1* | 6/2016 | Sarikaya | G06F 16/90332 704/9 |
| 2016/0328383 A1* | 11/2016 | Cross, III | G06F 40/211 |
| 2017/0091169 A1* | 3/2017 | Bellegarda | G10L 15/183 |
| 2017/0140041 A1 | 5/2017 | Dotan-Cohen et al. | |
| 2018/0349794 A1* | 12/2018 | Georges | G06N 20/00 |

OTHER PUBLICATIONS

"International Search Report and Written Opinion Issued in PCT Application No. PCT/US2018/038658", dated Aug. 21, 2018, 14 Pages.

Dhingra, et al., "Towards End-to-End Reinforcement Learning of Dialogue Agents for Information Access", In Proceedings of 55th Annual Meeting of the Association for Computational Linguistics, Retrieved on: Jun. 21, 2017, 12 pages.

Yang, et al., "End-To-End Joint Learning Of Natural Language Understanding and Dialogue Manager", In Proceedings of IEEE International Conference on Acoustics, Speech and Signal Processing, Mar. 5, 2017, 5 pages.

Shi, et al., "Contextual spoken language understanding using recurrent neural networks", In Proceedings of IEEE International Conference on Acoustics, Speech and Signal Processing, Apr. 19, 2015, 6 pages.

"Office Action Issued in European Patent Application No. 18740057.7", dated Feb. 4, 2021, 7 Pages.

\* cited by examiner

CONTEXTUAL SPOKEN LANGUAGE UNDERSTANDING IN A SPOKEN DIALOGUE SYSTEM

BACKGROUND

Comprehension of natural language by machines, at a near-human level, is a major goal for Artificial Intelligence. Indeed, most human knowledge is collected in the natural language of text. A spoken dialogue system that can interact with a person using unstructured, real-world text has therefore garnered significant attention from scientists, engineers, and scholars. This is due, at least in part, to the fact many processing tasks in a spoken dialogue system, such as entity identification, intent and domain determination, and contextual understanding, depend implicitly or explicitly on the ability of the spoken dialogue system to understand and reason with natural language.

It is with respect to these and other general considerations that embodiments have been described. Also, although relatively specific issues have been discussed, it should be understood that the embodiments should not be limited to solving the specific issues identified in the background.

SUMMARY

In one aspect, a spoken dialogue system includes a global apparatus for determining the query comprises a global command, an out-of-domain apparatus for determining if the query is an out-of-domain query, a confirmation apparatus for determining if the query comprises a confirmation type, and an intent and domain apparatus for determining an intent probability distribution and a domain probability distribution for the query. In some embodiments, the spoken dialogue system includes an entity apparatus for tagging each entity in the query and/or a selection apparatus for determining a score for each candidate option (e.g., a possible entity) when a tagged entity is associated with two or more candidate options (two or more possible entities).

In another aspect, a system for operating a spoken dialogue system includes a processing unit and a storage device for storing computer executable instructions that when performed by the processing unit, perform a method. The method includes comprising receiving, by the spoken dialogue system, a query and processing, by a spoken language apparatus in the spoken dialogue system, the query. The query can be processed to determine if the query is an out-of-domain query that is not supported by the spoken dialogue system, if the query comprises a global command, and/or if the query comprises a confirmation type.

In yet another aspect, a spoken language understanding apparatus includes a global apparatus for determining the query comprises a global command, an entity apparatus for tagging one or more entities in the query, an intent and domain apparatus for determining an intent and a domain associated with the query, and a confirmation apparatus for determining the query comprises a confirmation type. A method of providing the spoken language understanding apparatus includes determining initial word and phrase embeddings using a skip-gram training process, and adjusting the initial word and phrase embeddings using a plurality of lists to produce a first set of adjusted embeddings. Each list includes words and phrases that share similar semantic representations. The spoken language understanding apparatus is trained using the first set of adjusted embeddings. During training, the first set of adjusted embeddings are adjusted to produce a second set of adjusted embeddings. The first set of adjusted embeddings are adjusted to improve a correctness of an output produced by at least one of the global apparatus, the entity apparatus, the intent and domain apparatus, or the confirmation apparatus.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
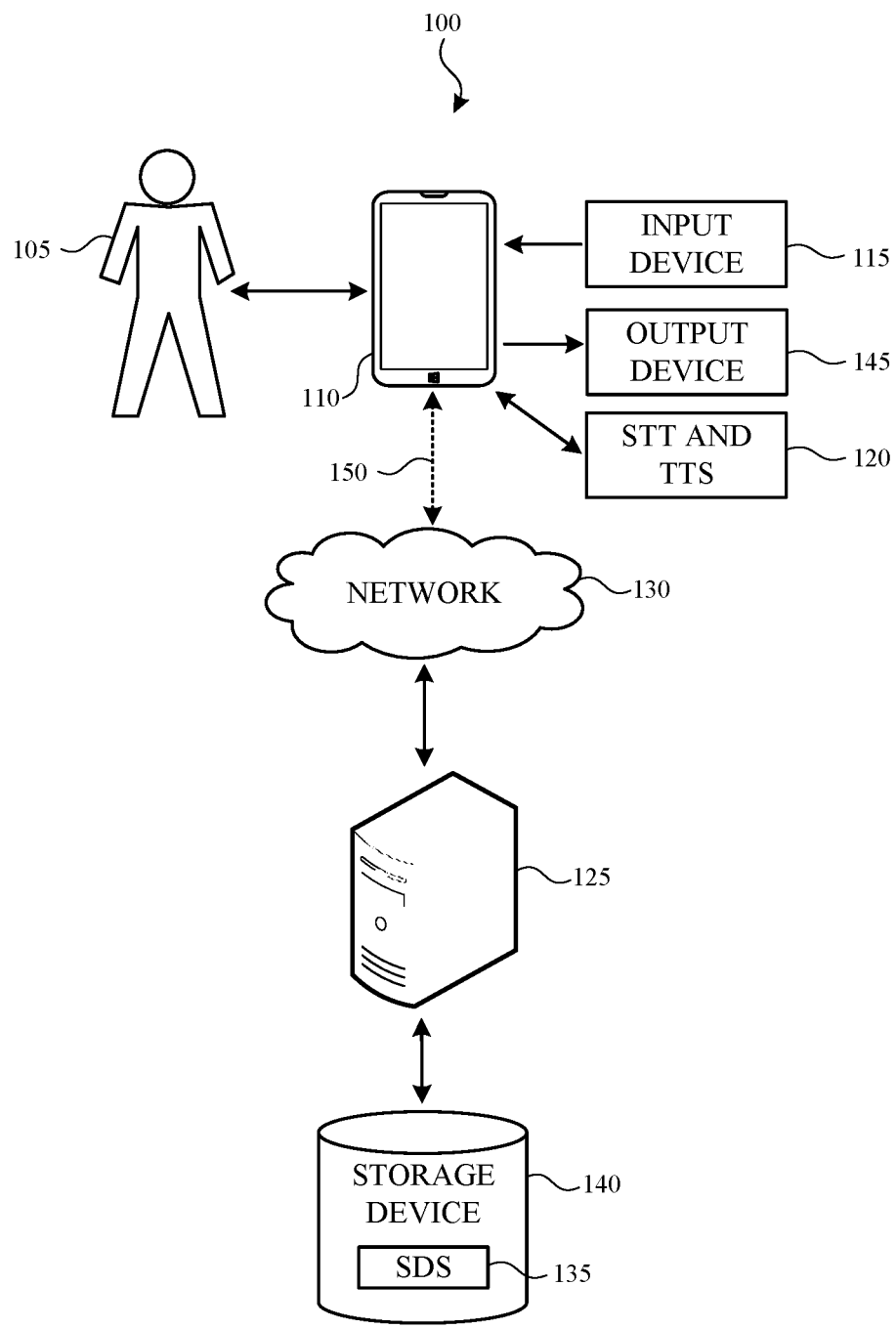
FIG. 1 illustrates an example system that can include a spoken dialogue system.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments discussed herein disclose a spoken language understanding (SLU) apparatus that is suitable for use in a spoken dialogue system (SDS). The SLU apparatus includes multiple apparatuses or operations that may process or operate on a query. A query is a natural language input that is received from a user. The query may be a spoken (verbal) natural language input or a written (text) natural language input.

The SLU apparatus can include an intent apparatus and a selection apparatus. The intent apparatus provides different outputs to the SDS that assist the SDS in determining a domain, an intent, and/or an action to perform in response to a query. One output indicates whether a query includes a global command. A global command is a not related to a domain (e.g., a non-domain specific query). A global command instructs the SDS or the machine (e.g., a server-computing device) to perform an action. Example actions include, but are not limited to, BACK, CANCEL, and REPEAT.

In some situations, the SDS will request the user to confirm an action or a constraint. Another output of the SLU apparatus indicates whether a query comprises a confirmation. In one embodiment, a confirmation may include YES, NO, and CHANGE.

The SLU apparatus can also output a probability distribution over the domains and a probability distribution over the intents. The probability distributions over the domain and the intent can used by the SDS to determine the domain and the intent associated with a query. Another output of the SLU apparatus provides one or more entities that are in the query and that can be used by the SDS to determine the domain and the intent associated with the query.

In some implementations, an SLU apparatus can also determine if a user's request that is associated with a query is an out of domain (OOD) query. An OOD query is a query that is not associated with a domain that is supported by the SDS. The SDS can cause an error notification to be provided to the user (e.g., via a client-computing device) when a query is an OOD query.

The intent apparatus can call the selection apparatus when a query includes an entity that is associated with two or more possible candidate entities or options. For example, when a query is "Call Andrew on his cell phone," a contact list may include two or more persons named Andrew. In this situation, the selection apparatus determines and provides a score for each of the two or more candidate options to the intent apparatus. Based on the scores, the intent apparatus can tag one of the candidate options (e.g., the candidate option with the highest probability) as an entity.

Also disclosed herein is a method for providing word and phrase embeddings for use in a spoken dialogue system. A word embedding models or represents a word in a vocabulary and a phrase embedding represents a phrase in the vocabulary. When a query is received, one or more word or phrase embeddings are obtained for each entity (e.g., word) in the query.

Initial word and phrase embeddings are determined using a skip-gram model. The initial word and phrase embeddings are then adjusted using a process that adjusts the embeddings to cause the word and phrase embeddings to be closer numerically between semantically similar words or phrases. For example, the process can adjust the word embeddings for the names of cities (e.g., "Toronto" and "Montreal") so the word embeddings are numerically closer together. The amount of time needed to search for word and phrase embeddings can be reduced when semantically similar words are phrases are closer together numerically.

The adjustment method produces a first set of adjusted embeddings. The first set of adjusted embeddings can then be used to train a SLU apparatus to improve the correctness or accuracy of the operations and outputs of the SLU apparatus. During the training process, the adjusted word and phrase embeddings in the first set of adjusted embeddings can be adjusted again to produce a second set of adjusted embeddings.

FIG. 1 illustrates an example system that can include a SDS. The system 100 generates and controls a machine response ("action") to a natural language input. The system 100 allows a user 105 to submit the natural language input through a client-computing device 110. The client-computing device 110 may include, or be connected to, an input device 115 that receives the natural language input. The natural language input can be submitted as a written input (e.g., text) or as a spoken (audio) input that is converted to text (e.g., using a speech-to-text (STT) apparatus 120). The input device 115 may be any suitable type of input device or devices configured to receive the language input. In non-limiting examples, the input device 115 may be a keyboard (actual or virtual) and/or a microphone.

The client-computing device 110 is configured to access one or more server-computing devices (represented by server-computing device 125) through one or more networks (represented by network 130) to interact with a spoken dialogue system (SDS) 135 stored on one or more storage devices (represented by storage device 140). The SDS 135 can include a computer-executable program that is executed on the server-computing device 125. In one or more embodiments, the network 130 is illustrative of any suitable type of network, for example, an intranet, and/or a distributed computing network (e.g., the Internet) over which the user 105 can communicate with other computing systems.

As will be described in more detail later, the SDS 135 receives the natural language input and causes one or more machine actions to be performed in response to the natural language input. The machine action(s) can be provided to the user 105 through one or more output devices (represented by output device 145) that is in, or connected to, the client-computing device 110. In non-limiting examples, the output device 145 is a display that displays the machine response and/or a speaker that "speaks" the machine response (e.g., using a text-to-speech (TTS) apparatus 120).

In one or more embodiments, the client-computing device 110 is a personal or handheld computing device having both the input and the output devices 115, 145. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with an SDS may be utilized.

As should be appreciated, FIG. 1 is described for purposes of illustrating the present methods and systems and is not intended to limit the disclosure to a particular sequence of steps or a particular combination of hardware or software components.

A dialogue between a machine and a user relies on turn-taking behavior. For example, a user can ask the machine to locate an Italian restaurant in downtown, which is a first turn in the dialogue. In response to the request, the machine may state it was unable to find an Italian restaurant in downtown, which is a machine response and a second turn in the dialogue. In task-oriented spoken dialogues, a user has a goal (or task) he or she wants to achieve in the dialogue. For example, a user may want to obtain the name of a restaurant. A spoken dialogue system obtains information about the user's goal based on the user turns in the dialogue.

As the dialogue progresses, the spoken dialogue system is able to obtain the information needed to complete the user's goal.

A spoken dialogue system typically operates in a domain. The domain is related to the user's goal. For example, in the weather domain, a user may obtain information on the weather (e.g., the temperature). Similarly, in the restaurant domain, a user can obtain the address of a restaurant that serves a particular type of food.

Each domain has slot types ("slots") that are associated with the domain. A slot is a variable, and a slot value ("value") is a value that fills the slot. For example, in the restaurant domain, a food type may be a slot and a type of food (e.g., "Italian") can be a value for that slot. Over the turns in the dialogue, the spoken dialogue system obtains information about the user's goal and the information needed to complete the user's goal.

Figure 2:
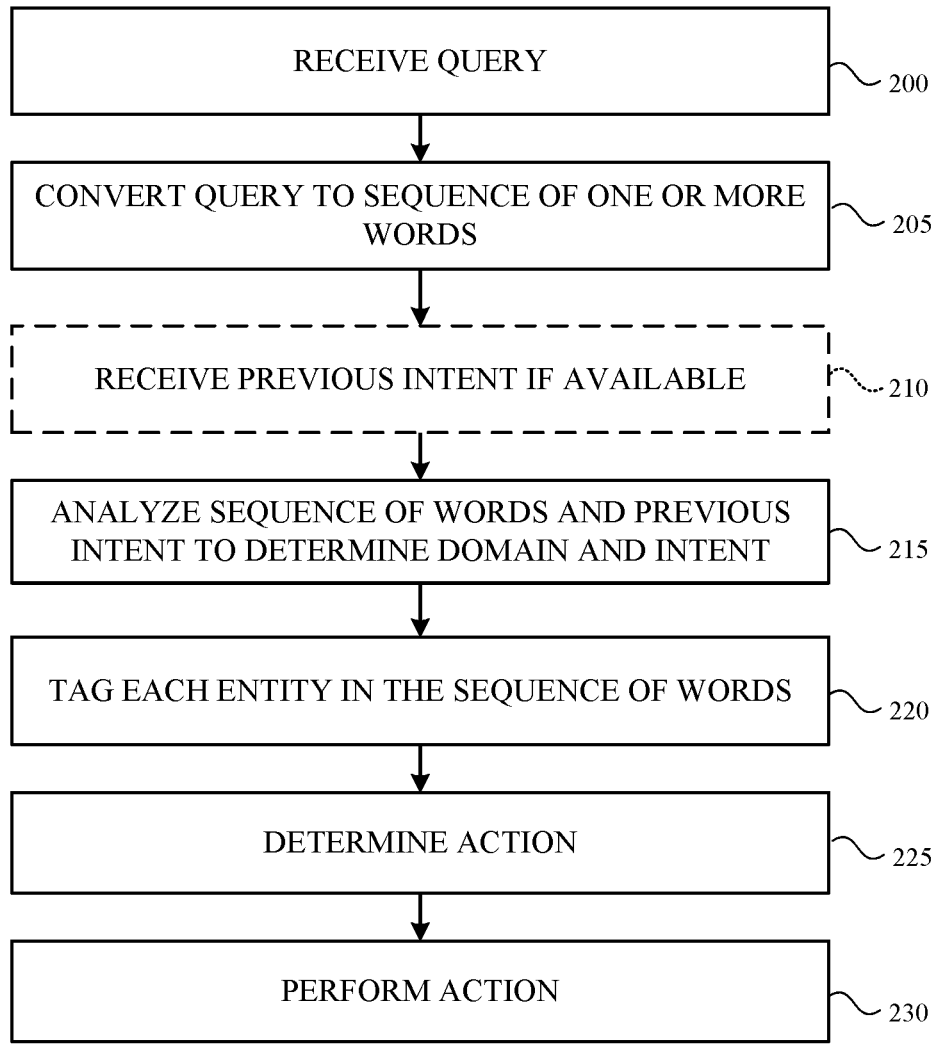
FIG. 2 is flowchart depicting a method of operating a spoken dialogue system.

A general and brief description of the components, operations, and/or functions of an SDS will now be described. FIG. 2 is flowchart depicting a method of operating a spoken dialogue system. Initially, as shown in block 200, a query is received from a user. As described earlier, the query may be received as a text input or a verbal input. The query generally includes the user's utterance (e.g., the natural language input) and/or context information.

Next, as shown in block 205, the query is converted to a sequence of words. For example, in one embodiment, a token operation is performed to convert the query into a sequence of one or more words. At block 210, a previous intent can be received when an intent has been previously determined. Block 210 is depicted with dashed lines to indicate that in some embodiments a previous intent may not be received because a previous intent is not available (e.g., does not exist).

The sequence of one or more words and the previous intent (if available) are analyzed and a domain and an intent associated with the query are determined (block 215). Based on the determined intent, one or more entities (e.g., words) are tagged in the sequence of one or more words (block 220). An "entity" can be a slot, a slot value, or a context field. For example, if the query is "Call Andrew on his cell phone," the word "Andrew" is a slot value for a contact slot and "cell phone" is a contact field. The contact field informs the SDS that the call is to be made to Andrew's cell phone instead of another number (e.g., Andrew's home phone).

The SDS then analyzes the intent, the context, and the one or more entities to determine an action a machine (e.g., client-computing device 110 in FIG. 1) will take in response to the query (block 225). At block 230 the machine performs the action.

Figure 3:
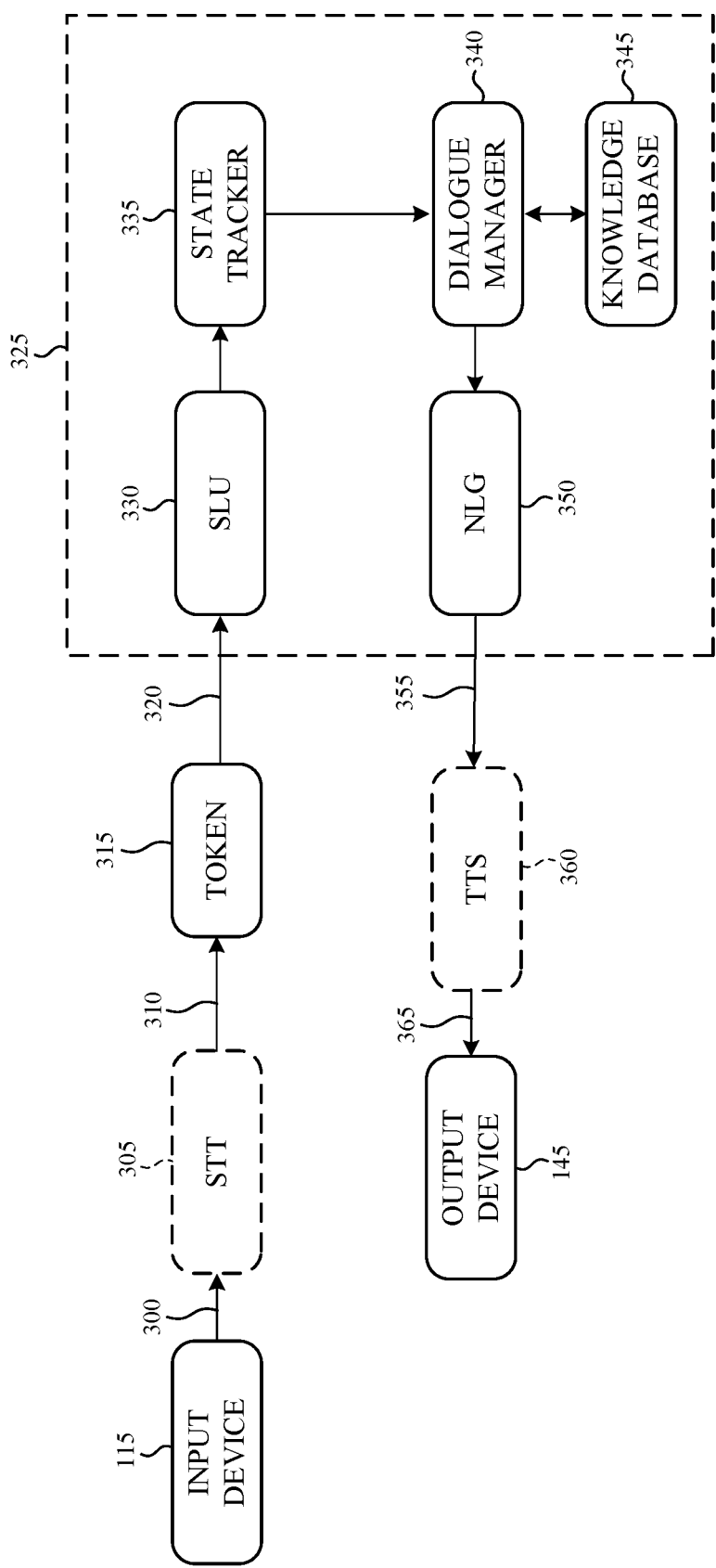
FIG. 3 is a block diagram illustrating an example system that includes a spoken dialogue system.

FIG. 3 is a block diagram depicting an example system that includes an SDS. An input device 115 receives a query (e.g., a natural language input) from a user. The input device 115 produces an output 300 that represents the natural language input. In some embodiments, when the natural language input is an audio input, the output 300 is received by the STT apparatus 305 that converts the audio input into a text input 310. One example of an STT apparatus 305 is an automatic speech recognition apparatus. A token operation 315 is performed on the text input 310 to convert the input into a sequence of words 320.

An SDS 325 receives the sequence of words 320. The SDS 325 includes a spoken language understanding (SLU) apparatus 330, a state tracker 335, a dialogue manager 340, a knowledge database 345, and a natural language generator (NLG) 350. The operations of the SDS 325 are performed by one or more computing devices, such as, for example, one or more server-computing devices. The one or more computing devices each include (or are operably connected to) at least one storage device that stores computer or processing unit executable instructions that, when executed by at least one processing unit in the computing device(s), perform the operations of the SDS 325.

As will be described in more detail later, the SLU apparatus 330 may determine if the query is in one of a predetermined set of domains or is an out-of-domain query. The SLU apparatus 330 can also determine if the query is a global command. A global command can be a query that is not related to the current context, domain or intent. For example, the query may be a command to terminate the dialogue or to return to a previous state of the dialogue. Additionally, the SLU apparatus 330 determines a probability distribution over the domains supported by the SDS and a probability distribution over the intents associated with the supported domains. In some instances, The SLU apparatus 330 may also classify a natural language input as a confirmation regarding an action or a constraint (e.g., an entity).

In some implementations, the state tracker 335 tracks what has happened in the dialogue, which is known as the state of the dialogue. The state of the dialogue includes (1) a current turn; and (2) all the turns that precede the current turn. Based on the dialogue state, the dialogue manager 340 determines a machine action to be performed (e.g., how the machine should respond to the user's turn in the dialogue).

In some embodiments, the dialogue manager 340 can access a knowledge database 345. The knowledge database 345 captures or defines information about words, word embeddings, slots, values, properties of entities that a dialogue system can talk about, and relationships between words, word embeddings, slots, values, and/or the properties of entities (e.g., files, look-up tables, databases, and the like). Non-limiting examples of a knowledge database include an ontology and/or a dictionary.

The NLG 350 receives the machine action from the dialogue manager 340 and generates a natural language output 355 for the machine action. An NLG 350 typically has to determine what should be said, how it should be said (e.g., syntax), and then produce the output text. When the natural language output 355 is to be provided to the user as a verbal output, a TTS apparatus 360 receives the natural language output 355 from the NLG 350 and synthesizes the corresponding verbal output 365. The verbal output 365 is then provided to the user using an output device 145 (e.g., via a speaker). In some instances, the natural language output 355 will be presented to the user as a written output using the output device 145 (e.g., via a display), in which case the TTS apparatus 360 does not operate on the natural language output 355.

The various components shown in FIG. 3 can be implemented in any suitable device in a system (e.g., a client-computing device 110, a server-computing device 125). For example, in one embodiment, the STT apparatus 305, the SDS 325, and the TTS apparatus 360 are implemented in one or more server-computing devices (e.g., server-computing device 125). In another non-limiting example, the STT apparatus 305 and the TTS apparatus 360 are implemented in a client-computing device (e.g., client-computing device 110 and STT and TTS apparatuses 120 in FIG. 1) and the SDS 325 is implemented in one or more server-computing devices.

Figure 4:
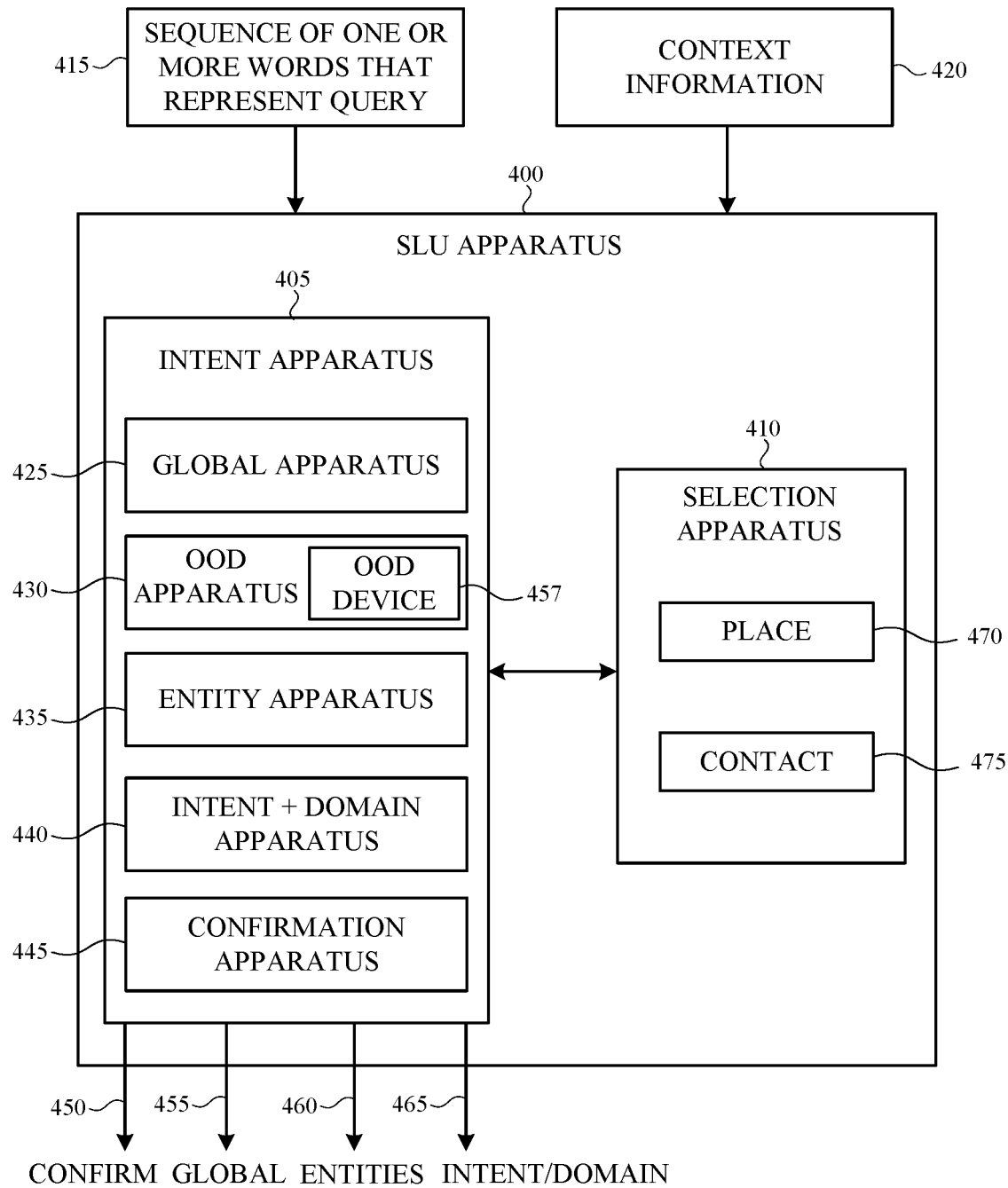
FIG. 4 is a block diagram depicting an example spoken language understanding apparatus that is suitable for use in a spoken dialogue system.

FIG. 4 is a block diagram depicting an example SLU apparatus that is suitable for use in a spoken dialogue system. In one embodiment, the SLU apparatus is implemented in a neural network. One example of a neural network is a bi-directional recurrent neural network ("bi-directional RNN").

The SLU apparatus 400 includes an intent apparatus 405 and a selection apparatus 410. The SLU apparatus 400 receives a sequence of one or more words input 415 that represents the query. In cases where there is a previous query, the context information 420 is another input to the SLU apparatus 400. The context information 420 includes the domain and the intent associated with the previous query.

The intent apparatus 405 includes a global apparatus 425, an out-of-domain (00D) apparatus 430, an entity apparatus 435, an intent and domain apparatus 440, and a confirmation apparatus 445. The outputs of the intent apparatus 405 include a confirmation output 450, a global output 455, one or more entities 460, and an intent and domain output 465. In FIG. 4, the selection apparatus 410 depicts two example selection devices; a place selection device 470 and a contact selection device 475. Additional or different selection devices may be used in other embodiments. The various apparatuses and selection devices are discussed in more detail below.

Global Apparatus

The global apparatus 425 receives and analyzes the sequence of one or more words input 415 to determine if the query is a global command. For example, in some instances, a user may want to terminate the dialogue or go back to a previous state in the dialogue. Based on the determination, the global apparatus 425 produces a global output 455 that indicates whether the query is or is not a global command.

In one embodiment, the global output 455 can be configured as BACK, CANCEL, NEXT, NONE, REPEAT, AND UNKNOWN. "BACK" instructs the SDS to go back to a previous dialogue state. "CANCEL" instructs the SDS to terminate the entire dialogue. "NEXT" instructs the SDS to cause the next page of choices or options to be provided to a machine (e.g., the client-computing device 110 in FIG. 1) and "NONE" instructs the SDS that none of the choices on the current page are relevant. "REPEAT" can be used to request a repeat of the last action. "UNKNOWN" instructs the SDS that the query is not a global command.

OOD Apparatus

Typically, the domains and the intents are included in a predetermined set of domains and intents. Each domain can include multiple intents and each intent belongs to one domain. The OOD apparatus 430 receives and analyzes the sequence of one or more words input 415 to determine if the query is an OOD query. An OOD query can be a query that is unclear, a query that is associated with a domain that is not supported by the SDS, or the intent associated with the query is an intent that is not supported by the SDS (e.g., the intent is not associated with a domain). For example, a user may state "I am feeling good today" without an intent to obtain a response from the SDS. In this situation, the OOD apparatus 430 determines the query is an OOD query.

Generally, in-domain queries are associated with a particular domain when the entity or entities are near similar entities in a word embedding space. Unlike in-domain queries, OOD queries can scatter throughout the entire word embedding space. The OOD apparatus 430 determines whether the query is or is not included in a domain.

In some embodiments, the OOD apparatus 430 includes an OOD device 457 for each supported domain. In one aspect, the OOD apparatus 430 determines if a query is an OOD query using the following equation:

$$P(O) = \Sigma_d P(O|D=d)P(D=d),$$  Equation 1 where P(O) is a probability that a query is an OOD query, O is a binary random variable that indicates whether the query is OOD, D is a random variable of a predicted domain, and d is the value of D. Equation 1 determines a probability distribution over all of the domains that the query is out of a domain. In one embodiment, the probability associated with each domain is determined using a multi-layer perceptron (MLP) neural network model with the context information (e.g., previous intent and domain) and end states from the bi-directional RNN.

Entity Apparatus

The entity apparatus 435 receives and analyzes the sequence of one or more words input 415 to extract or tag each word ("entity") in the sequence of words. Each word in the sequence of one or more words input 415 can be a word that indicates a sematic constraint of the query (an entity). Alternatively, a word may not be very informative or useful in determining the intent and domain of the query. For example, if the query requests directions to a location, some of the words in the query identify the context (e.g., directions), the origin location and/or the destination location.

The entity output 460 includes a tag for each word in the sequence of one or more words input 415. Each tag identifies the word as a word to be used, or to not be used, in determining the intent and domain. For example, if the query is "Call Andrew on his cell phone," the words "Andrew," "cell," and "phone" are tagged as words (or the phrase "cell phone" is tagged) to be used to determine the intent and domain. The words "call," "on," and "his" are tagged as words to not be used to determine the intent and domain.

The entity apparatus 435 also tags the previous intent if a previous intent was determined. In this manner, a current intent can be determined based at least in part on the previous intent.

In one embodiment, the entity apparatus 435 performs both a query classification and entity tagging based on one or more of the outputs from the global apparatus 425, the confirmation apparatus 445, the OOD apparatus 430, and the selection apparatus 410. The entity apparatus 435 uses a global context information to tag entities, where the global context information is obtained from the bi-directional RNN and the query classification. The global context information is data (e.g., mathematical representations or vectors) that captures the information needed to classify the user intent and the tags. Each token representation (e.g., word) contains the overall semantical meaning (e.g., information regarding intents) of the query. In some aspects, the one or more entities are tagged after the entity apparatus 435 considers a concatenation of the forward and the backward states of each step in the bi-directional RNN and the intent distribution of the entire query that is produced by the intent and domain apparatus 440.

In an example embodiment, a MLP neural network model is used to predict a score for the tag associated with each word in the query. Additionally, a conditional random field (CRF) is used to model the context constraint of neighboring tags and select the tag with the highest score. The probability of a tag sequence associated with the query can be defined by the following equation:

$$P(t_{1:n}) = \frac{1}{Z} \exp\left(\sum_i^T \eta f(t_{i-1}, t_i) + g(t_i)\right),$$  Equation 2 where $g(t_i)$ is the score estimation from the MLP neural network model based on the output of the bi-directional RNN, and $f(t_{i-1}, t_i)$ is the function defined on the neighboring tag constraints. In this example embodiment, each word receives a maximum score to produce an optimal score across the sequence. For example, the entity apparatus 435 can use a forward-backward algorithm to get the prediction, does the backward propagation during training, and uses a second algorithm (e.g., a Viterbi search) to determine an acceptable (e.g., optimal) sequence at inference time.

Intent and Domain Apparatus

The domain is a coarse granularity classification of a topic that relates to the query. Example domains include, but are not limit to, WEATHER, CALL, MESSAGE SEND/READ, CALENDAR, NAVIGATION, MUSIC, VEHICLE, APPLICATION, ENTERTAINMENT, SOCIAL, NEWS, ALARM, and FINANCE. The intent is a finer granularity classification about the specific task or action the user wants performed. For example, make a telephone call, ask for directions to a location, and search for a movie and/or the start times of a particular movie are intents.

Typically, the intent and domain apparatus 440 determines a probability distribution over all of the domains and a probability distribution over the intents using a predetermined set of domains and intents. In one embodiment, the intent and domain apparatus 440 analyzes the input 415 and if available, the context information 420 to determine or predict a probability distribution for the intents and a probability distribution for the domains. The probability distributions are included in the intent and domain output 465.

Confirmation Apparatus

In some situations, the machine will request the user confirm an action or a constraint (e.g., an entity). The confirmation apparatus 445 analyzes the query to determine if the query is a confirmation of the action or the constraint and produces a confirm output 450 that indicates whether the query is or is not a confirmation. In one embodiment, the confirm output 450 is one of four possible confirmation types; YES, NO, CHANGE, and UNKNOWN. "YES" instructs the SDS that the user accepts or confirms the action or the constraint. "NO" instructs the SDS that the user does not accept or confirm (e.g., rejects) the action or the constraint. "CHANGE" instructions the SDS that the user partially confirms the action or constraint but wants to modify the query (e.g., modify an action or a constraint). "UNKNOWN" instructs the SDS that the user has not responded to the request. For example, a user may provide a query that is unrelated to the confirmation request.

In one embodiment, the concatenation of the end states of the bi-directional RNN is used by the confirmation apparatus 445 to determine if a query is a confirmation type (e.g., a confirmation of an action or a constraint). Additionally, the confirmation apparatus 445 may analyze the context information input 420 when determining if the query is a confirmation type.

Selection Apparatus

The intent apparatus 405 calls the selection apparatus 410 when there are multiple candidate options (e.g., multiple possible entities) for an entity and the user needs to select one of the candidate options. For example, if the query is "Call Andrew on his cell phone", the intent apparatus will call the selection apparatus when the user's list of contacts includes two or more persons named Andrew. In this situation, the selection apparatus 410 returns a score for each "Andrew" (e.g., each candidate option or possible entity) to the intent apparatus 405. Each score indicates a probability that the candidate option is the correct candidate option.

In the illustrated embodiment, the selection apparatus 410 includes two selection devices; a place device 470 and a contact device 475. The place device 470 is used to select a place from two or more candidate place options. For example, the place device 470 can be used in the domains NAVIGATION and CALENDAR. The inputs to the place device 470 can include a current domain probability, the query, and Name Entity Recognition (e.g., tag) and N-grams (e.g., N=1,2,3) to each field (e.g., name, category, address) phonetic distance.

The contact device 475 is used to select a contact (e.g., a person, a business) from two or more candidate contact options. In a non-limiting example, the contact device 475 may be used in the domains CALL, MESSAGING SENT/READ, and CALENDAR. The inputs to the contact device 475 can include a previous domain, a current domain probability, the query to the contact name, Name Entity Recognition to each contact name phonetic distance, query length, and number of candidate contact options.

In one embodiment, the selection apparatus 410 uses a MLP neural network model that is a pairwise ranking model that takes input features of each candidate option. A score is given by the MLP neural network model $f_i$, $i=1, 2, N$, where N is the number of candidate options. In one implementation, $y_i \in \{-1, +1\}$, where +1 indicates a given positive option (e.g., a desired option) and −1 indicates a given negative option (e.g., an undesired option). Given these parameters, a loss function for the selection apparatus 410 can be defined by Equation 3:

$$L(y, f) = \sum_i |c - y_i f_i|_+ + \beta_1 \sum_{i,j: y_i=+1, y_j=-1} |c - (f_i - f_j)|_+ + \beta_2 \sum_{i,j: y_i=+1, y_j=+1} ||f_i - f_j| - c|_+$$

where $c>0$ is the margin of hinge loss, $\beta_1$ is a positive value that indicates the amount of penalty for not producing a score of a positive option that is larger than a score of a negative option within the margin (e.g., c), $\beta_2$ is a positive value that indicates the amount of penalty for getting positive scores that are too far from each other, and i and j are candidate options (e.g., i is a previous or next candidate option and j is the current candidate option). The selection apparatus 410 determines the scores to result in a minimal loss value or given loss value (e.g., loss value is equal to or less than a threshold value). The first component forces the correct sign of $f_i$ and the second component forces the correct order (e.g., positive options should have larger scores than negative options). The last component forces the scores of all of the positive options to be close numerically.

A selection apparatus 410 can include additional or different selection devices in other embodiments. For example, a selection apparatus can include a place device, a contact device, and/or a music device that selects music by song title and/or performer.

Figure 5:
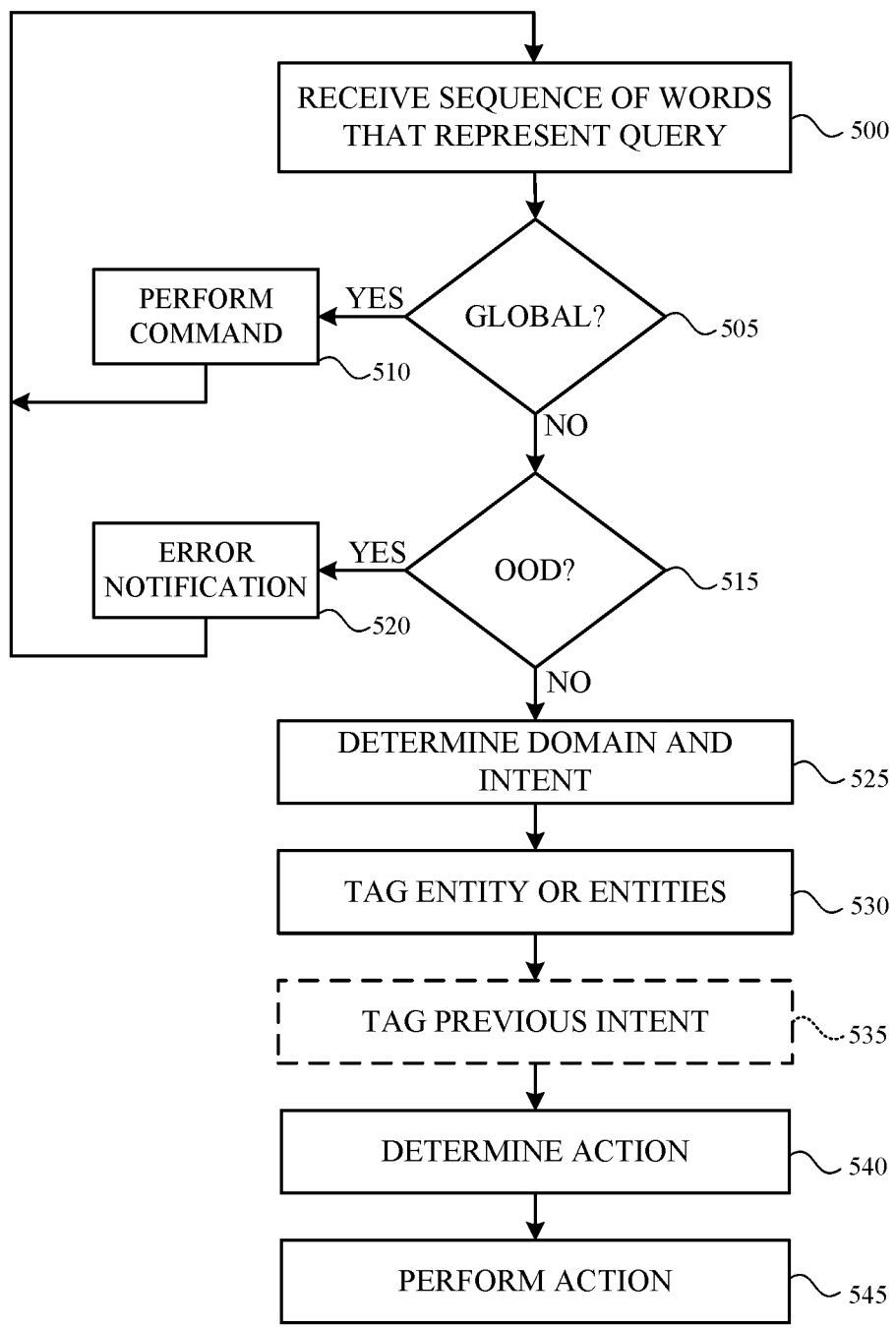
FIG. 5 is a flowchart illustrating a first example method of operating the spoken language understanding apparatus shown in FIG. 4.
Figure 6A:
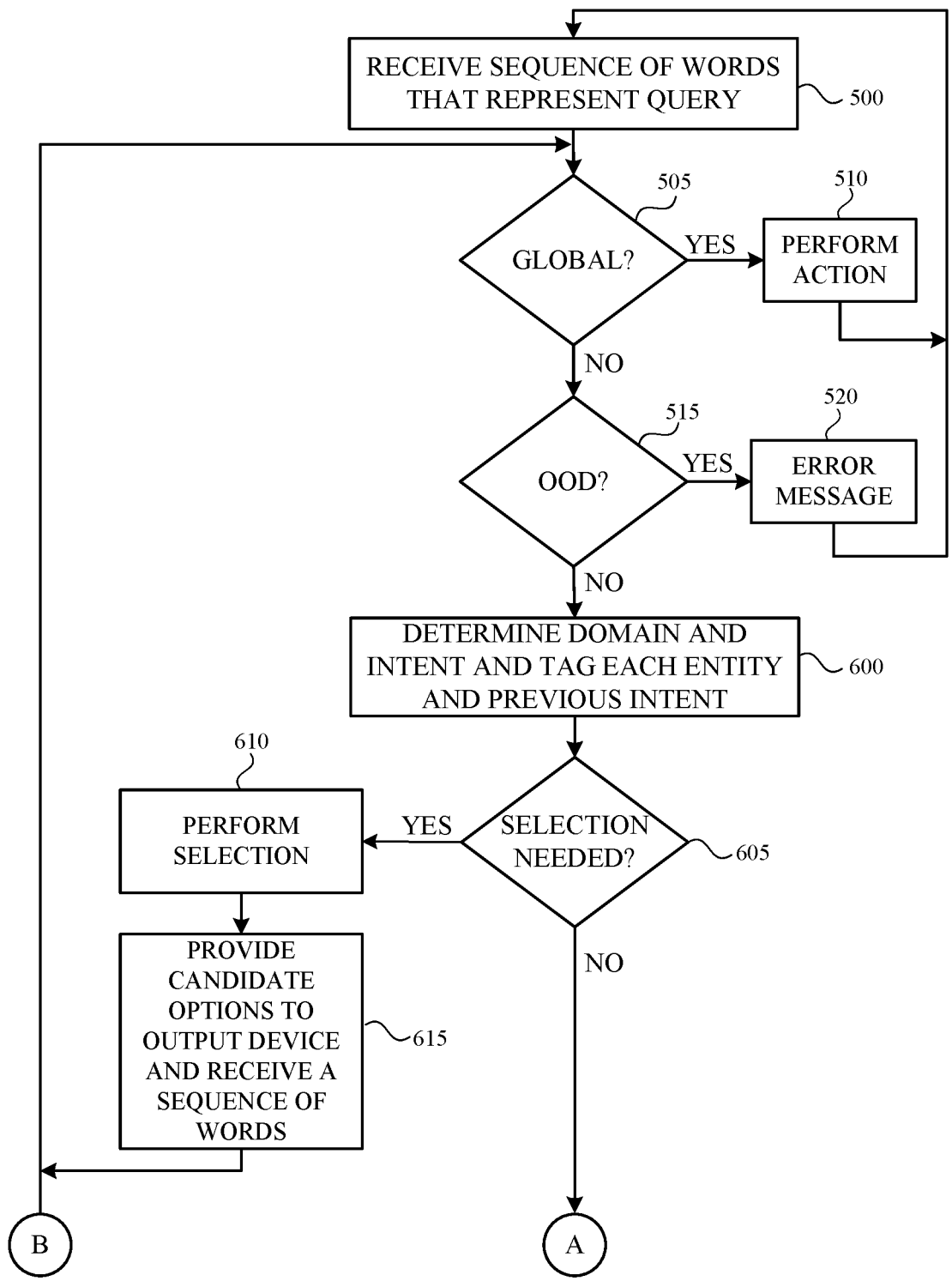
FIGS. 6A-6B are a flowchart depicting a second example method of operating the spoken language understanding apparatus shown in FIG. 4.
Figure 6B:
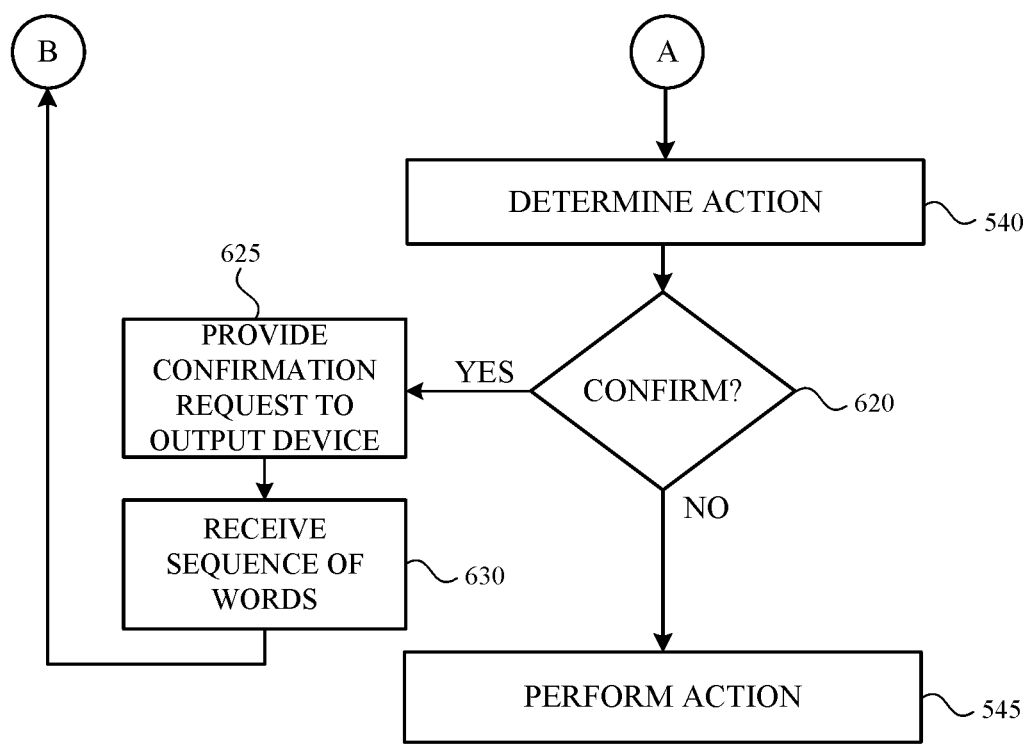

FIGS. 5 and 6A-6B depict two flowcharts that illustrate two example methods of operating the SLU apparatus shown in FIG. 4. In FIG. 5, the process begins at block 500 in response to the receipt of a sequence of one or more words that represent a query. A determination is then made by the global apparatus 425 at block 505 as to whether the sequence of one or more words is a global command. As described earlier, in one embodiment, the global commands include BACK, CANCEL, NEXT, NONE, REPEAT, AND UNKNOWN.

If the sequence of one or more words is a global command, the method passes to block 510 where the global command is performed. The process then returns to block 500 to wait for another sequence of one or more words. If the sequence of one or more words is not a global command, the method continues at block 515 where a determination is made by the OOD apparatus 430 as to whether the sequence of one or more words represents an OOD query. If the represented query is an OOD query, the process passes to block 520 where an error notification or message is provided (or is caused to be provided) to the user. The method then returns to block 500 to wait for another sequence of one or more words.

If the represented query is not an OOD query, the process continues at block 525 where the intent and domain apparatus 440 determines at block 530 a domain probability distribution and an intent probability distribution for the represented query. The domain and intent probabilities are included in the intent and domain output 465.

The entity apparatus 435 tags each entity (e.g., word) in the sequence of one or more words (block 530). Additionally, a previous intent can be tagged at block 535 if an intent was previously determined. The tagged entities and the previous intent (if available) are included in the entity output 460.

Next, as shown in block 540, the SDS (e.g., the dialogue manager 340 in FIG. 3) determines an action the machine is to perform based on the global output 455, the confirmation output 450, the entity output 460, and the intent and domain output 465. The action is then performed (or caused to be performed) by a computing device at block 545.

FIGS. 6A-6B are a flowchart illustrating a second example method of operating the SLU apparatus 400. Some operations in FIGS. 6A-6B are the same as some of the operations in FIG. 5. As such, the operations in FIG. 6 are identified with the same reference numbers used in FIG. 5 and are not described in detail.

Initially, blocks 500, 505, 510, 515, and 520 are performed. If the determination at block 515 is that the sequence of one or more words does not represent an OOD query, the method continues at block 600 where each entity (e.g., word), and possibly a previous intent, is tagged and the probability distributions over the domains and intents are determined. The operations in block 600 are similar to the operations in blocks 525, 530, and 535 in FIG. 5.

After the operation in block 600 is performed, a determination may be made at block 605 as to whether a selection of one or more candidate options is needed. If so, the method passes to block 610 where the selection apparatus 410 performs the selection process and returns a score for each candidate option. The candidate options, or a select number of candidate options, are provided to an output device and a second sequence of one or more words representing a second query is received at block 615. The candidate options may be presented to the user using any suitable output device (e.g., output device 145 in FIG. 1). For example, the candidate options may be presented as a visual output using a display or presented as an audio output using a speaker. The process then returns to block 505 and repeats until a determination is made at block 605 that a selection is not needed.

When the determination at block 605 is that a selection is not needed, the method continues at block 540 where the SDS determines an action to be performed. A determination may then be made at block 620 as to whether a confirmation of the action is needed. If not, the action is performed at block 545. If a confirmation is needed, the process continues at block 625 where a confirmation request is provided to an output device that presents the confirmation request to the user. The confirmation request may be presented to the user using any suitable output device (e.g., output device 145 in FIG. 1). For example, the confirmation request may be presented as a visual output using a display or presented as an audio output using a speaker.

After the operation in block 625 is performed, a third sequence of one or more words that represent a third query is received at block 630. The method then returns to block 505 and repeats until a confirmation is not needed. When the determination at block 620 is that a confirmation is not needed, the action is performed at block 545.

The flowcharts in FIGS. 5 and 6A-6B represent only two example methods of operating the SLU 400. Other embodiments are not limited to these two example methods. Based on the descriptions of the apparatuses and devices in the SLU apparatus 400, different operations may be performed by the SLU apparatus 400 in other embodiments.

The operations performed by the various apparatuses in the SLU apparatus can be arranged to perform any suitable process. For example, the confirmation apparatus 445 may determine if a received sequence of one or more words is a confirmation type. If not, the OOD apparatus 430 can determine if the sequence of one or more words represents an OOD query (block 515). If not, the global apparatus 425 may determine if the sequence of one or more words is a global command (block 505). If not, the operations in blocks 525, 530, 535, 540 and 545 can be performed.

Figure 7:
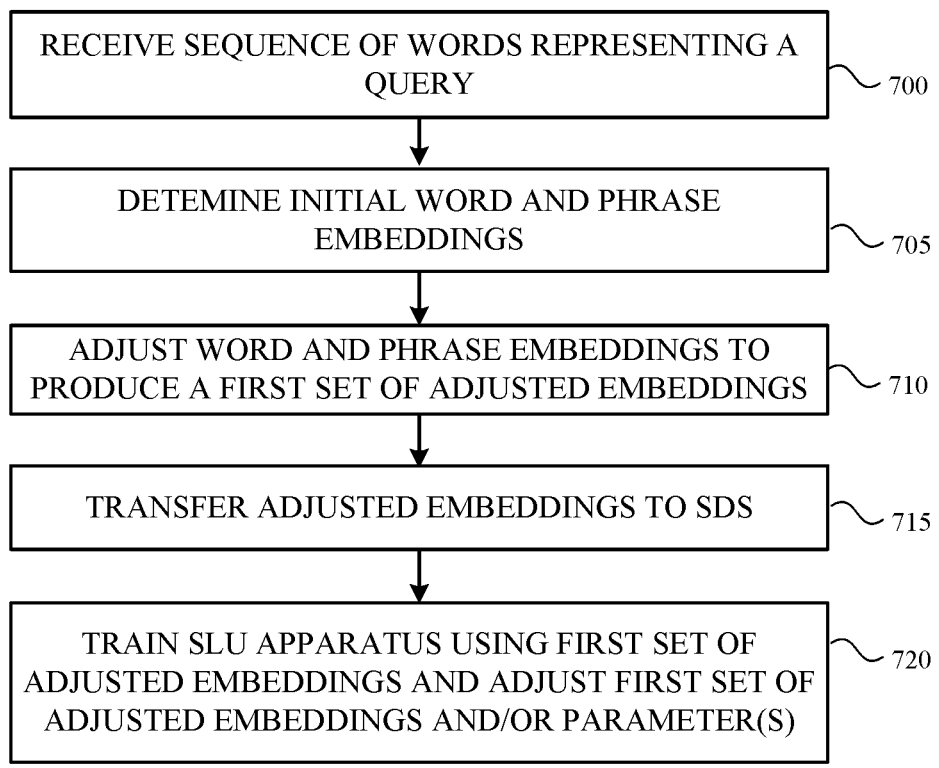
FIG. 7 is a flowchart illustrating an example method of providing word and phrase embeddings for use in a spoken dialogue system.

FIG. 7 is a flowchart illustrating an example method of training a SLU apparatus. Initially, as shown in block 700, a sequence of one or more words that represent a query is received. Some queries include phrases as well as words, and the semantic meaning of a phrase can be very different from the meanings of the individual words in the phrase. Thus, in one aspect, phrase embeddings are included with the word embeddings. A word embedding models or represents a word in a vocabulary and a phrase embedding represents a phrase in the vocabulary. The vocabulary, word embeddings, and/or phrase embeddings can be stored in a knowledge database (e.g., knowledge database 345 in FIG. 3). Typically, the word and phrase embeddings map the words and phrases to vectors of real numbers.

The initial phrase embeddings are determined together with the word embeddings at block 705. In an example embodiment, the initial word and phrase embeddings are estimated or determined using a skip-gram model. With the skip-gram model, the word and phrase embeddings are determined using one or more known datasets. In a non-limiting example, the word and phrase embeddings are determined using a known online database such as Wikipedia®, a query log dataset and a training dataset.

The words and the phrase embeddings are determined to maximize the probability of a predicting a contextual word given an observed word. In one embodiment, the probability is defined by the following equations:

$$\hat{U}, \hat{V} = \mathrm{argmax} \Pi_i \Pi_{j \neq i, i-w \leq j \leq i+w} P(x_i \mid x_j; U, V), \quad \text{Equation 4}$$

$$P(x_i \mid x_j; U, V) \propto e^{U_{x_i}^T V_{x_j}} \quad \text{Equation 5}$$

where $x_i$ is a target word at the i-th position in the sequence and $x_j$ is a context word within the window of $[i-w, i+w]$. U, V are the word embedding and the conjugate embedding, respectively.

Returning to FIG. 7, the initial word and phrase embeddings are adjusted at block 710 to produce a first set of adjusted embeddings. An adjustment process adjusts the initial word and phrase embeddings to cause the word and phrase embeddings to be numerically closer between semantically similar words or phrases. For example, the names of cities or businesses are adjusted to be near each other numerically. The amount of time needed to search for word and phrase embeddings can be reduced when semantically similar words are phrases are closer together numerically. The adjustment process uses multiple lists of words or phrases that share similar semantic representations (e.g., belong to the same semantic group). For example, a city list includes all city names, a sports team lists includes a list of the names of sports teams.

Equations 4 and 5 are used to adjust the initial word and phrase embeddings. The values for $\hat{U}$ and $\hat{V}$ are optimized or determined by maximizing the probability of contextual words given an observed word. Additionally, a cost function is used to ensure the adjusted word and phrase embeddings are close to the original word or phrase embedding and to other word or phrase embeddings in the same list. In an example embodiment, the cost function (C) is defined by the equation:

$$C = \Sigma_i \alpha_i \|u_i - \hat{u}_i\| + \Sigma_{j,(i,j) \in G} \beta_{ij} \|u_i - u_j\|, \quad \text{Equation 6}$$

where $\hat{u}_1$ is the original embedding for the $i^{th}$ word or phrase and $u_i, u_j$ are the updated embeddings for the $i^{th}$ and $j^{th}$ words (e.g., i is a previous or next word and j is the current word). In Equation 6, the first term defines the cost of the deviation of the adjusted word or phrase embedding from the original word or phrase embedding and the second term defines the cost of the deviation of the adjusted word or phrase embedding from other words or phrases in the same list. The word and the phrase embeddings are adjusted until the cost function C is minimized or is at a given value (e.g., a value that is equal to or less than a threshold value).

Returning to FIG. 7, after the initial word and the phrase embeddings are adjusted to produce the first set of adjusted embeddings, the adjusted word and phrase embeddings are transferred to a SDS (block 715). The SLU apparatus in the SDS is then trained using the first set of adjusted embeddings and the first set of adjusted embeddings (e.g., the first adjusted word embeddings) are adjusted again to produce a second set of adjusted embeddings (block 720). Additionally or alternatively, one or more parameters of the bi-directional RNN can be adjusted at block 720. The training process is performed until the outputs of the SLU apparatus are at a given accuracy or correctness level (e.g., a given confidence level). In one embodiment, the word and phrase embeddings are adjusted in block 720 using Equation 6 or a different cost function.

Figure 8:
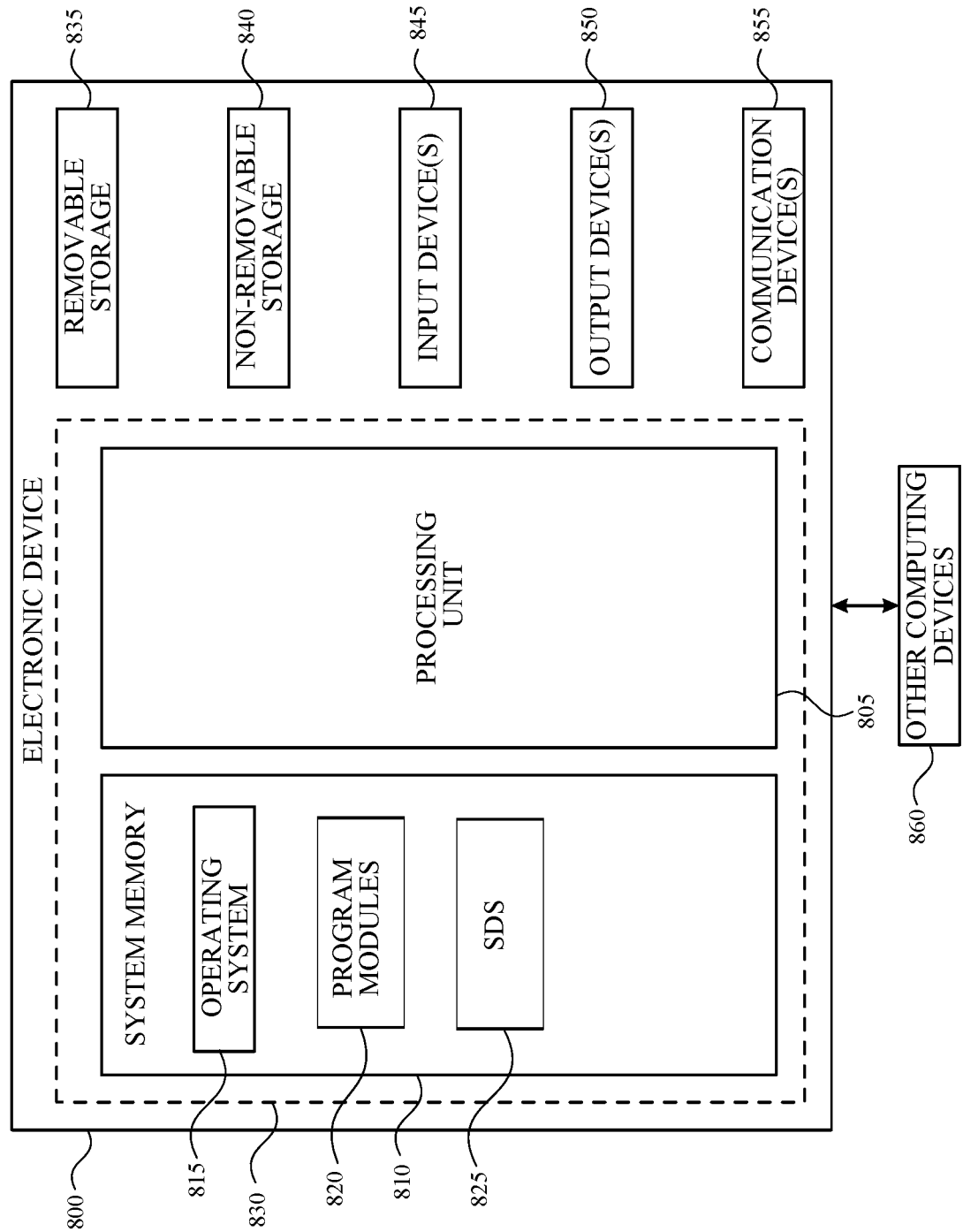
FIG. 8 is a block diagram depicting example physical components of an electronic device with which aspects of the disclosure may be practiced.
Figure 9A:
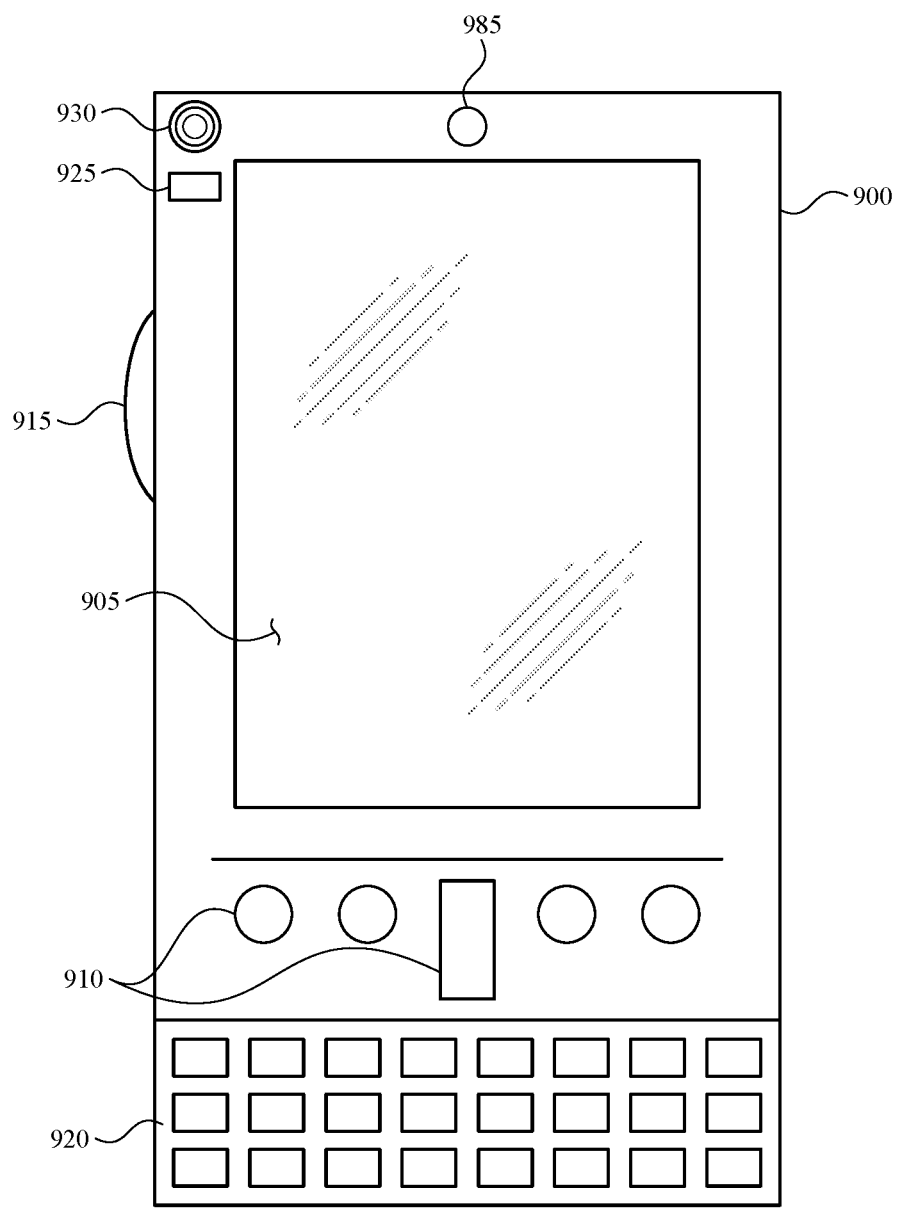
FIGS. 9A-9B are simplified block diagrams illustrating a mobile computing device with which aspects of the present disclosure may be practiced.
Figure 9B:
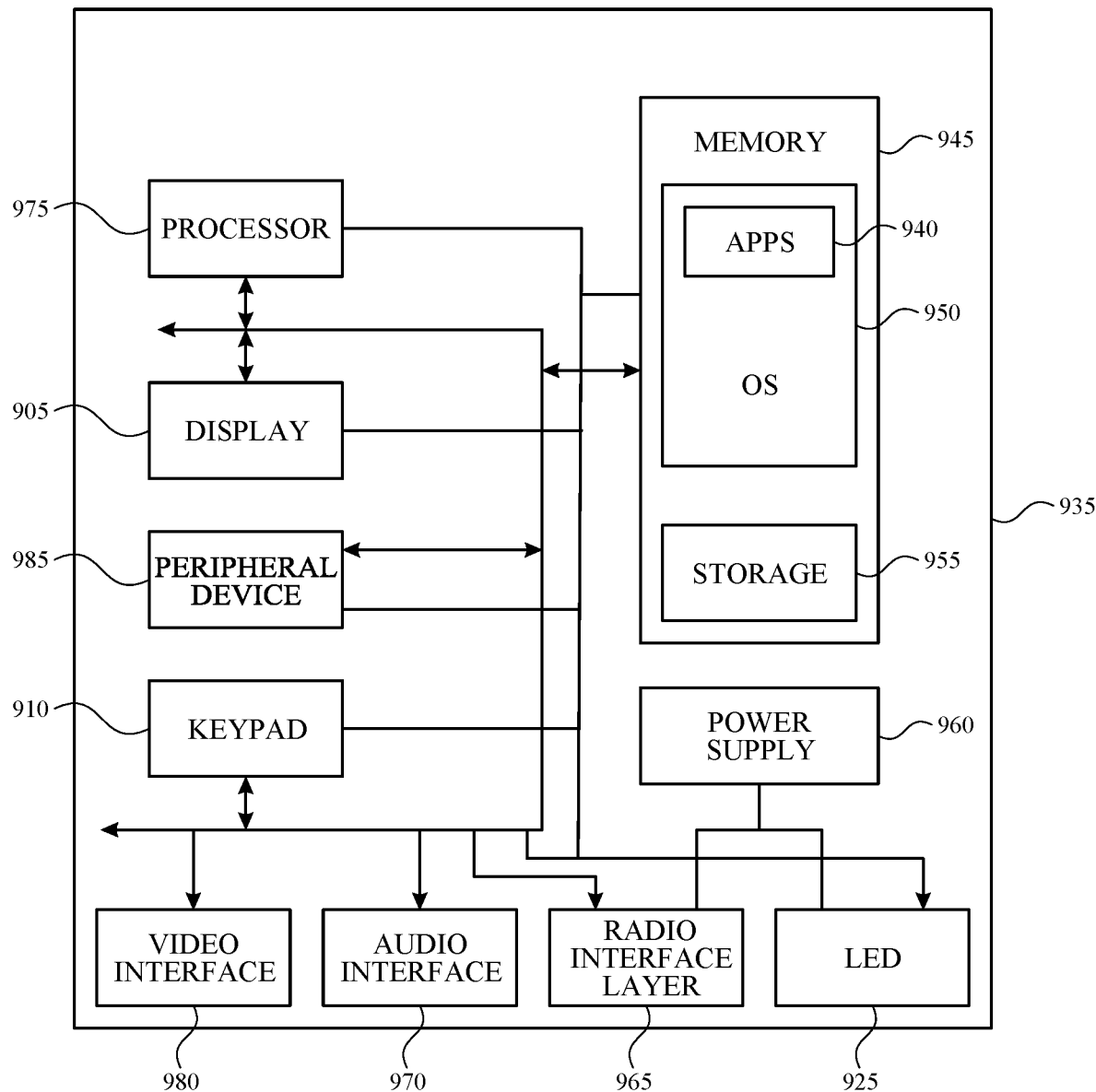
Figure 10:
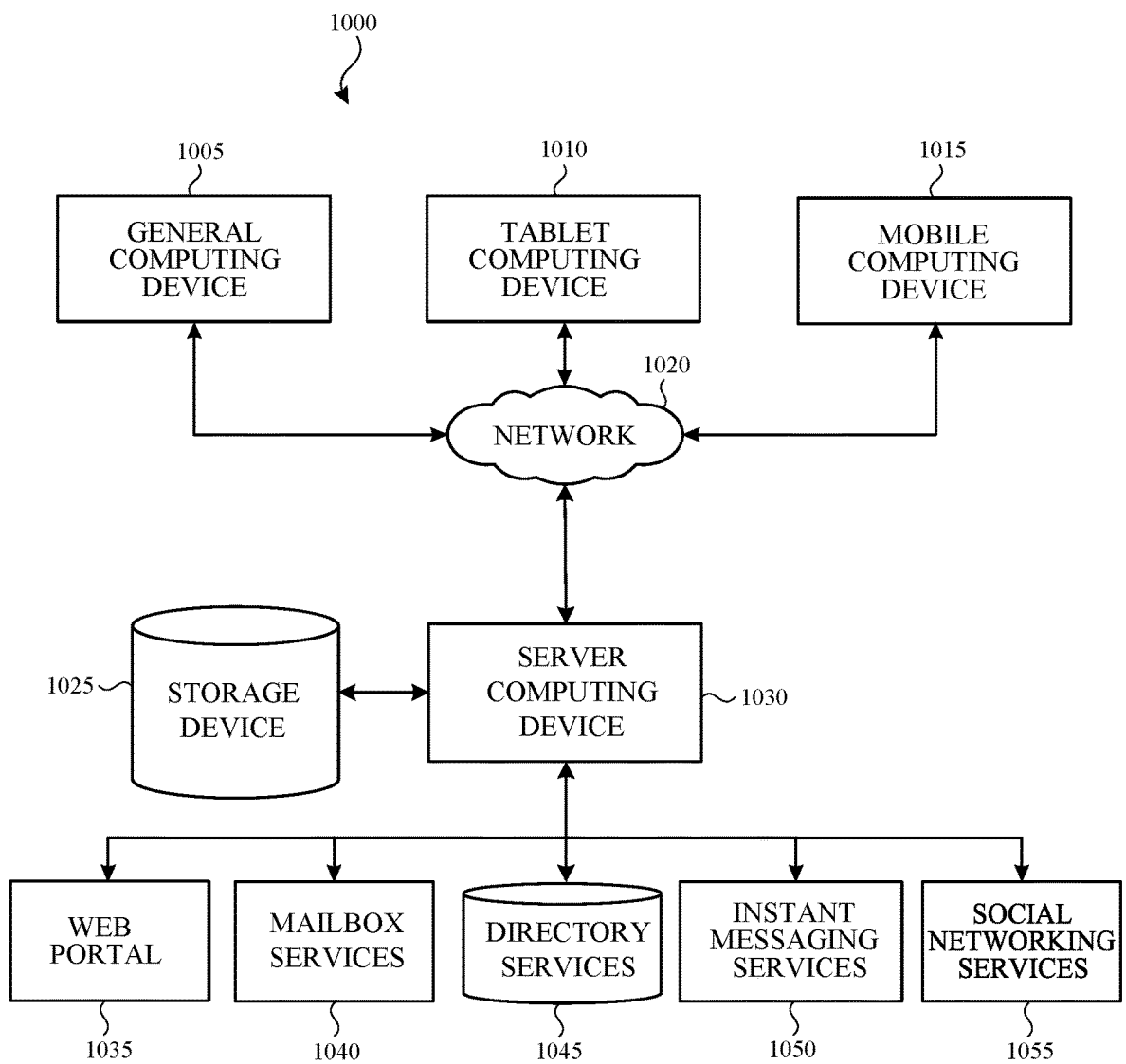
FIG. 10 is a block diagram depicting a distributed computing system in which aspects of the present disclosure may be practiced.

FIGS. 8-10 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of electronic device configurations that may be utilized for practicing aspects of the disclosure, as described herein.

FIG. 8 is a block diagram depicting physical components (e.g., hardware) of an electronic device 800 with which aspects of the disclosure may be practiced. The components described below may be suitable for the computing devices described above, including the server-computing device 125 in FIG. 1.

In a basic configuration, the electronic device 800 may include at least one processing unit 805 and a system memory 810. Depending on the configuration and type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, and a SDS 825. While executing on the processing unit 805, the SDS 825 may perform and/or cause to be performed processes including, but not limited to, the aspects as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 830.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 835 and a non-removable storage device 840.

The electronic device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned devices are examples and others may be used. The electronic device 800 may include one or more communication devices 855 allowing communications with other electronic devices 860. Examples of suitable communication devices 855 include, but are not limited to, an radio frequency (RF) transmitter, a receiver, and/or transceiver circuitry, network circuitry, and universal serial bus (USB), parallel, and/or serial ports.

The term computer-readable media as used herein may include computer storage media or devices. Computer storage devices may include volatile and nonvolatile, removable and non-removable storage devices implemented in any method or technology for storage of information, such as computer readable instructions, data structures, or program modules.

The system memory 810, the removable storage device 835, and the non-removable storage device 840 are all computer storage device examples (e.g., memory storage). Computer storage devices may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage device may be part of the electronic device 800. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors.

FIGS. 9A and 9B illustrate a mobile electronic device 900, for example, a mobile telephone, a smart phone, wearable computer (such as a smart watch), a tablet computer, a laptop computer, a navigation device, a gaming device, and the like, with which embodiments of the disclosure may be practiced. The components described below may be suitable for the computing devices described above, including the client-computing device 110 in FIG. 1.

With reference to FIG. 9A, one aspect of a mobile electronic device 900 for implementing the aspects is illustrated. In a basic configuration, the mobile electronic device 900 is a handheld computer having both input elements and output elements. The mobile electronic device 900 typically includes a display 905 and one or more input buttons 910 that allow the user to enter information into the mobile electronic device 900. The display 905 of the mobile electronic device 900 may also function as an input device (e.g., a display that accepts touch and/or force input).

If included, an optional side input element 915 allows further user input. The side input element 915 may be a rotary switch, a button, or any other type of manual input element. In alternative aspects, mobile electronic device 900 may incorporate more or less input elements. For example, the display 905 may not be a touch screen in some embodiments. In yet another alternative embodiment, the mobile electronic device 900 is a portable phone system, such as a cellular phone. The mobile electronic device 900 may also include an optional keypad 920. Optional keypad 920 may be a physical keypad or a "soft" keypad generated on the touch screen display.

In various embodiments, the output elements include the display 905 for showing a graphical user interface (GUI) and a set of available templates, a visual indicator 925 (e.g., a light emitting diode), and/or an audio transducer 930 (e.g., a speaker). In some aspects, the mobile electronic device 900 incorporates a vibration transducer for providing the user with tactile feedback. In yet another aspect, the mobile electronic device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile electronic device 900. That is, the mobile electronic device 900 can incorporate a system (e.g., an architecture) 935 to implement some aspects. In one embodiment, the system 935 is implemented as a "smart phone" capable of running one or more applications (e.g., browser, e-mail, calendaring, contact managers, messaging clients, games, media clients/players, content selection and sharing applications and so on). In some aspects, the system 935 is integrated as an electronic device, such as an integrated personal digital assistant (PDA) and wireless phone.

One or more application programs 940 may be loaded into the memory 945 and run on or in association with the operating system 950. Examples of the application programs include phone dialer programs, navigation programs, e-mail programs, personal information management (PIM) programs, word processing programs, spreadsheet programs, Internet browser programs, messaging programs, and so forth.

The system 935 also includes a non-volatile storage area 955 within the memory 945. The non-volatile storage area 955 may be used to store persistent information that should not be lost if the system 935 is powered down.

The application programs 940 may use and store information in the non-volatile storage area 955, such as an SDS and the like. A synchronization application (not shown) also resides on the system 935 and is programmed to interact with a corresponding synchronization application resident on a host computer to keep the information stored in the non-volatile storage area 955 synchronized with corresponding information stored at the host computer.

The system 935 has a power supply 960, which may be implemented as one or more batteries. The power supply 960 may further include an external power source, such as an AC adapter or a powered docking cradle that supplements or recharges the batteries.

The system 935 may also include a radio interface layer 965 that performs the function of transmitting and receiving radio frequency communications. The radio interface layer 965 facilitates wireless connectivity between the system 935 and the "outside world," via a communications carrier or service provider. Transmissions to and from the radio interface layer 965 are conducted under control of the operating system 950. In other words, communications received by the radio interface layer 965 may be disseminated to the application programs 940 via the operating system 950, and vice versa.

The visual indicator 925 may be used to provide visual notifications, and/or an audio interface 970 may be used for producing audible notifications via an audio transducer (e.g., audio transducer 930 illustrated in FIG. 9A). In the illustrated embodiment, the visual indicator 925 is a light emitting diode (LED) and the audio transducer 930 may be a speaker. These devices may be directly coupled to the power supply 960 so that when activated, they remain on for a duration dictated by the notification mechanism even though the processor 975 and other components might shut down for conserving battery power. The LED may be programmed to remain on indefinitely until the user takes action to indicate the powered-on status of the device.

The audio interface 970 is used to provide audible signals to and receive audible signals from the user (e.g., voice input such as described above). For example, in addition to being coupled to the audio transducer 930, the audio interface 970 may also be coupled to a microphone to receive audible input, such as to facilitate a telephone conversation. In accordance with embodiments of the present disclosure, the microphone may also serve as an audio sensor to facilitate control of notifications, as will be described below.

The system 935 may further include a video interface 980 that enables an operation of peripheral device 985 (e.g., on-board camera) to record still images, video stream, and the like.

A mobile electronic device 900 implementing the system 935 may have additional features or functionality. For example, the mobile electronic device 900 may also include additional data storage devices (removable and/or non-removable) such as, magnetic disks, optical disks, or tape. Such additional storage is illustrated in FIG. 9B by the non-volatile storage area 955.

Data/information generated or captured by the mobile electronic device 900 and stored via the system 935 may be stored locally on the mobile electronic device 900, as described above, or the data may be stored on any number of storage media that may be accessed by the device via the radio interface layer 965 or via a wired connection between the mobile electronic device 900 and a separate electronic device associated with the mobile electronic device 900, for example, a server-computing device in a distributed computing network, such as the Internet (e.g., server-computing device 125 in FIG. 1). As should be appreciated such data/information may be accessed via the mobile electronic device 900 via the radio interface layer 965 or via a distributed computing network. Similarly, such data/information may be readily transferred between electronic devices for storage and use according to well-known data/information transfer and storage means, including electronic mail and collaborative data/information sharing systems.

As should be appreciated, FIG. 9A and FIG. 9B are described for purposes of illustrating the present methods and systems and is not intended to limit the disclosure to a particular sequence of steps or a particular combination of hardware or software components.

FIG. 10 is a block diagram illustrating a distributed system in which aspects of the disclosure may be practiced. The system 1000 allows a user to interact with a SDS using, or through a general computing device 1005 (e.g., a desktop computer), a tablet computing device 1010, and/or a mobile computing device 1015. The general computing device 1005, the tablet computing device 1010, and the mobile computing device 1015 can each include the components, or be connected to the components, that are shown associated with the electronic device 900 in FIG. 9.

The general computing device 1005, the tablet computing device 1010, and the mobile computing device 1015 are each configured to access one or more networks (represented by network 1020) to interact with one or more programs (not shown) stored in one or more storage devices (represented by storage device 1025). The program(s) stored on storage device 1025 can be executed on one or more server-computing devices (represented by server-computing device 1030). The server-computing device 1030 can include the components, or be connected to the components, that are shown associated with the electronic device 800 in FIG. 8. In some embodiments, the SDS is stored on the storage device 1025 and executed by the server-computing device 1030.

In some aspects, the server-computing device 1030 can access and/or receive various types of services, communications, documents and information transmitted from other sources, such as a web portal 1035, a mailbox services 1040, a directory services 1045, instant messaging services 1050, and/or social networking services 1055. In some instances, these sources may provide robust reporting, analytics, data compilation and/or storage service, etc., whereas other services may provide search engines or other access to data and information, images, videos, document processing and the like.

As should be appreciated, FIG. 10 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A spoken dialogue system comprising at least one memory storing executable instructions, that when executed by at least one processing unit, cause the spoken dialogue system to:

analyze, using a neural network, an input to the spoken dialogue system and provide a first output indicating the input comprises a global command when the input is determined as the global command, wherein the global command comprises a command to the spoken dialogue system to perform an action that is unrelated to a domain and relates to a change in a dialogue state;

when the input is not the global command, analyze, using the neural network, the input to the spoken dialogue system and provide a second output indicating the input is an out-of-domain query, wherein the out-of-domain query relates to a domain that is absent in a predetermined set of domains supported by the spoken dialogue system; and when the second input does not indicate the out-of-domain query, analyze, using the neural network, the input to the spoken dialogue system and provide a third output comprising an intent probability distribution and a domain probability distribution associated with the input.

2. The spoken dialogue system of claim 1, wherein the at least one memory stores executable instructions that cause the spoken dialogue system to tag one or more entities in the input, each tag indicating at least one of:

the entity that is tagged is to be used in determining an intent or a domain associated with the input; or the entity that is tagged is not to be used in determining the intent or the domain associated with the input.

3. The spoken dialogue system of claim 1, wherein the at least one memory stores executable instructions that cause the spoken dialogue system to provide a score for each candidate option when a tagged entity is associated with multiple candidate options.

4. The spoken dialogue system of claim 3, wherein the multiple candidate options comprise multiple candidate contacts.

5. The spoken dialogue system of claim 3, wherein the multiple candidate options comprise multiple candidate places.

6. The spoken dialogue system of claim 1, wherein the at least one memory stores executable instructions that cause the spoken dialogue system to analyze the input to the spoken dialogue system and provide a fourth output indicating the input comprises a confirmation type, the confirmation type comprising one of multiple confirmation types.

7. The spoken dialogue system of claim 1, wherein the global command is one of multiple global commands.

8. A system for operating a spoken dialogue system, the system comprising:
   a processing unit; and
   a storage device for storing computer executable instructions that when performed by the processing unit, perform a method comprising:
      receiving, by the spoken dialogue system, a query;
      processing, by a spoken language apparatus in the spoken dialogue system, an input associated with the query to:
         analyze, using a neural network, the input and provide an output indicating the input is an out-of-domain query that is not associated with a domain that is absent in a predetermined set of domains supported by the spoken dialogue system;
         analyze, using the neural network, the input and provide an output indicating the input comprises a global command when the input is determined as the global command, the global command comprising an instruction to the spoken dialogue system to perform an action that is unrelated to a domain and relates to a change in a dialogue state; and
         analyze, using the neural network, the input and tag one or more entities in the input, each tag indicating:
            the entity that is tagged is to be used in determining an intent or a domain associated with the input; or
            the entity that is tagged is not to be used in determining the intent or the domain associated with the input.

9. The system of claim 8, wherein the storage device stores computer executable instructions to tag a previous intent and each entity in the query.

10. The system of claim 9, wherein the query is processed by the spoken language understanding apparatus to determine a probability distribution over all intents and a probability distribution over all domains based at least in part on each tagged entity and the tagged previous intent.

11. The system of claim 8, wherein the storage device stores computer executable instructions to perform a selection operation when the query includes an entity that is one of two or more possible entities, wherein the selection operation produces a score for each possible entity that is included in the two or more possible entities.

12. The system of claim 11, wherein the two or more possible entities comprise two or more contacts.

13. The system of claim 11, wherein the two or more possible entities comprise two or more places.

14. The system of claim 11, wherein the spoken language apparatus processes the input to, prior to performing the selection operation, provide the two or more possible entities to an output device and responsively receiving a second query.

15. The system of claim 8, wherein the storage device stores computer executable instructions to analyze the input and provide an output indicating the input comprises a confirmation type, the confirmation type comprising one of multiple confirmation types.

16. The system of claim 8, wherein the global command is one of multiple global commands.

17. The system of claim 8, wherein the system comprises a server-computing device and the query is received from a client-computing device.

18. A method of operating a spoken dialogue system that includes a global apparatus using a neural network, the method comprising:
   determining when a user query comprises one or more of:
      a global command, the global command comprising a command to the spoken dialogue system to perform an action that is unrelated to a domain and relates to a change in a dialogue state;
      an entity apparatus, the entity apparatus tagging one or more entities in the user query;
      an intent and domain apparatus, the intent and domain apparatus determining an intent and a domain associated with the user query; and
      a confirmation apparatus, the confirmation apparatus determining when the user query comprises a confirmation type;
   determining initial word and phrase embeddings using a skip-gram training process;
   adjusting the initial word and phrase embeddings using a plurality of lists to produce a first set of adjusted embeddings, each list comprising words and phrases that share similar semantic representations;
   training the spoken language understanding apparatus using the first set of adjusted embeddings; and
   adjusting the first set of adjusted embeddings to produce a second set of adjusted embeddings, wherein the first set of adjusted embeddings are adjusted to improve a correctness of an output produced by at least one of the global apparatus, the entity apparatus, the intent and domain apparatus, or the confirmation apparatus.

19. The method of claim 18, wherein the global apparatus, the entity apparatus, the intent and domain apparatus, and the confirmation apparatus are included in a neural network and the method further comprises adjusting one or more parameters of the neural network to improve a correctness of an output produced by at least one of the global apparatus, the entity apparatus, the intent and domain apparatus, or the confirmation apparatus.

20. The spoken dialogue system of claim 1, wherein the at least one memory stores executable instructions that cause the spoken dialogue system to, based on at least one of the first, the second, the third, or the fourth output, provide an output to a computing device indicating an action to be performed by the computing device.

* * * * *